United States Patent [19]

Ellis

[11] Patent Number: 5,389,498

[45] Date of Patent: Feb. 14, 1995

[54] PHOTOCHEMICAL GENERATION OF DYES

[75] Inventor: Richard J. Ellis, Great Dunmow, Great Britain

[73] Assignee: Minnesota Mining and Manufacturing Company, St. Paul, Minn.

[21] Appl. No.: 147,646

[22] Filed: Nov. 4, 1993

[30] Foreign Application Priority Data

Nov. 16, 1992 [GB] United Kingdom ............... 9224004

[51] Int. Cl.$^6$ ............................................. G03C 1/73
[52] U.S. Cl. ................................. 430/340; 430/332; 430/338; 430/336; 430/944
[58] Field of Search .............. 430/332, 336, 338, 340, 430/944; 360/135

[56] References Cited

U.S. PATENT DOCUMENTS

| | | | |
|---|---|---|---|
| 3,275,442 | 9/1966 | Kosenkranius | 430/332 |
| 3,533,792 | 10/1970 | Petro et al. | 430/337 |
| 3,916,069 | 10/1975 | Tiers et al. | 430/338 |
| 3,942,988 | 3/1976 | Datta | 430/495 |
| 4,008,085 | 2/1977 | Lemahieu et al. | 430/336 |
| 4,055,430 | 10/1977 | Hasegawa et al. | 430/340 |
| 4,187,105 | 2/1980 | Wainer et al. | 430/336 |
| 4,547,444 | 10/1985 | Bell et al. | 430/11 |
| 4,950,639 | 8/1990 | DeBoer et al. | 503/227 |
| 5,135,842 | 8/1992 | Kitchin et al. | 430/510 |

FOREIGN PATENT DOCUMENTS

| | | |
|---|---|---|
| 0068876 | 6/1982 | European Pat. Off. . |
| 0455083A1 | 4/1991 | European Pat. Off. . |
| 3704263A1 | 8/1988 | Germany . |

*Primary Examiner*—Charles L. Bowers, Jr.
*Assistant Examiner*—John A. McPherson
*Attorney, Agent, or Firm*—Gary L. Griswold; Walter N. Kirn; Roger R. Tamte

[57] ABSTRACT

A photosensitive element for the production of near infrared absorbing images having a photosensitive medium comprising a trialkyl orthoester, a photochemical source of a strong acid and a compound of the formula (I):

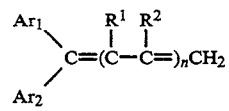

wherein:
  n is 0 or 1,
  $R^1$ and $R^2$ are independently members selected from the group consisting of hydrogen and alkyl groups of up to 5 carbon atoms and
  $Ar_1$ and $Ar_2$ are independently members selected from the group consisting of aryl groups bearing an electron-donating substituent in the 4-position.

15 Claims, No Drawings

PHOTOCHEMICAL GENERATION OF DYES

FIELD OF THE INVENTION

This invention relates to the generation of dyes, particularly near infrared absorbing dyes (NIR dyes) by photochemical reaction of their precursors. The invention also relates to photosensitive elements capable of generating a NIR dye.

BACKGROUND TO THE INVENTION

Near infrared absorbing dyes find widespread use in imaging and information storage, particularly when information is to be written or read by means of a laser diode or similar source. As well as the conventional photographic applications such as sensitisation, acutance and antihalation, NIR dyes find increasing use in the conversion of radiant energy to thermal energy in systems such as optical data storage (by ablation of dyed polymer layers) and laser-addressed thermal transfer imaging.

Tetra-arylpolymethine dyes have found use in many of these systems, as disclosed, for example, in U.S. Pat. Nos. 4,547,444, 5,135,842 and 4,950,639.

In certain systems, notably in optical data storage, it is desirable to have the dye present in a coated layer in accordance with a predetermined pattern. For example, in optical discs it is necessary to provide servo tracking information to enable the read/write head to find any specified location on the disc with precision. This may be achieved by forming the storage media as a series of narrowly spaced concentric rings. Recently, the need has arisen to provide similar laser-readable information as an additional layer on otherwise conventional magnetic data storage media as disclosed, for example, in our co-pending U.S. application Ser. No. 08/152,811.

A potentially attractive route for forming such a predetermined pattern of NIR dye is to create the dye by photochemical reaction of its precursors in response to image-wise light exposure. Unfortunately, very few suitable systems are known which allow such image-wise formation of NIR dye. European Patent No. 68876 discloses photoimagable oxoinodolizine dyes which are NIR absorbing. The dyes are formed by a thermal reaction between cyclopropenone derivatives and certain pyridine derivatives. Selective photolysis of the cyclopropenone prior to thermal processing inhibits dye formation in light struck areas.

The present invention provides an alternative photoimagable dye class, with the formation of dye enabled, rather than disabled, in the light struck areas.

BRIEF SUMMARY OF THE INVENTION

According to the present invention there is provided a photosensitive element for the production of near infrared absorbing images having a photosensitive medium comprising a trialkyl orthoester, a photochemical source of a strong acid and a compound of the formula (I):

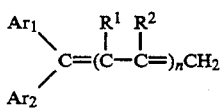

in which:

n is 0 or 1, $R^1$ and $R^2$ independently represent hydrogen or an alkyl group of up to 5 carbon atoms and $Ar_1$ and $Ar_2$ represents aryl groups bearing an electron-releasing substituent in the 4-position, generally containing up to 15 skeletal atoms.

The invention also provides a method of generating an image comprising a near infrared absorbing dye which comprises image-wise exposing a photosensitive element of the invention to actinic radiation and optionally heating the exposed elements to develop the image.

The invention finds particular utility in forming optical servo tracking systems on optical discs and magnetic discs and is also useful in other systems requiring the provision of laser readable information e.g. bar coding, security coding etc.

DESCRIPTION OF PREFERRED EMBODIMENTS

Trialkyl orthoesters suitable for use in the invention have the general formula:

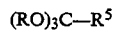

in which:

each R independently represents a lower alkyl group of up to 5 carbon atoms, preferably each R is ethyl, and $R^5$ represents a hydrogen atom, a lower alkyl group of up to 5 carbon atoms or an aryl group.

Exemplary trialkyl orthoesters include triethyl orthoformate, triethylorthoacetate, trimethyl orthobenzoate etc.

The photochemical source of a strong acid is a compound which releases a strong acid (pKa<3, preferably <1) on exposure to actinic radiation. Such photoacid generators are well known and include photosensitive onium salts where the anion is $PF_6$, $AsF_6$, $SbF_6$, $BF_4$, $ClO_4$, $CF_3SO_3$, etc., such as sulphonium salts, iodonium salts and iron onium salts. Preferred onium salts include diaryliodonium salts. A sensitiser may be optionally included to extend the spectral sensitivity as is well known in the art provided it does not scavenge the photoacid. Polycyclic hydrocarbons (e.g. anthracene derivatives) are suitable sensitisers for use with onium salts.

In the compounds of formula (I) n is preferably 0 and when n is 1 $R^1$ and $R^2$ are preferably hydrogen.

$Ar_1$ and $Ar_2$ are preferably:

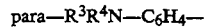

in which:

$R^3$ and $R^4$ independently represent alkyl groups of up to 5 carbon atoms, aryl groups or together complete a 5, 6 or 7 membered ring e.g. pyrrolidine, morpholine, piperidine, or $R^3$ and $R^4$ complete a julolidine ring system.

$Ar_1$ and $Ar_2$ may include other electron-releasing substituents in the 4- position, e.g., alkoxy groups and alkythio groups in which the alkyl group generally contain up to 5 carbon atoms.

As is well understood in this technical area, a large degree of substitution is not only tolerated, but is often advisable. As a means of simplifying the discussion and recitation of these groups, the terms "group" and "moiety" are used to differentiate between chemical species that allow for substitution or which may be substituted and those which do not or may not be so substituted. For example, the phrase "alkyl group" is intended to include not only pure hydrocarbon alkyl chains, such as methyl, ethyl, octyl, cyclo-hexyl, iso-octyl, tertbutyl and the like, but also alkyl chains bearing conventional substituents known in the art, such as hydroxyl, alkoxy, phenyl, halogen atoms (F, Cl, Br and I), cyano, nitro, amino etc. The phrase "alkyl moiety" on the other hand is limited to the inclusion of only pure hydrocarbon alkyl chains, such as methyl, ethyl, propyl, cyclohexyl, iso-octyl, t-butyl and the like.

The components of the photosensitive medium may be present in a single layer with or without binder or distributed between 2 or more contiguous layers. A single layer is preferred. Any of the commonly used film forming binders may be suitable provided there is adequate solubility in the coating solvent. The coating thickness will vary with the end use, but for optical servo tracking, very thin (<1 μm dry thickness) coatings with a minimum of binder are preferred. The orthoester and acid source are normally each present to the extent of 50 to 60 mol % of the compound of formula (I).

The photosensitive medium is exposed image-wise to a suitable source e.g. a UV lamp via a photographic mask. Exposure may be sufficient to complete the reaction and generate the NIR dye. However, a heating step, such as several minutes at about 70° C. or above may be required to develop the image. The compound of formula (I) reacts with orthoester and is believed to yield a tetra-arylpolymethine dye of the following formula:

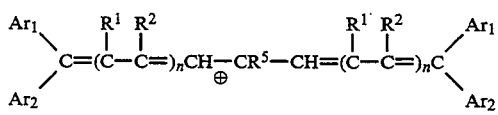

in which:

$R^5$ is hydrogen, lower alkyl or aryl.

To stabilise the image completely, orthoesters and photoacid generator may be removed by washing in dilute acid, although this may not be necessary in many applications. Suitable acids include acetic acid.

The invention will now be illustrated by the following Examples in which the NIR dye generated was believed to have the formula:

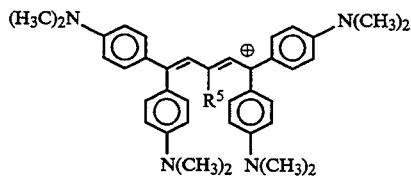

where
$R^5 = C_6H_5$ (Example 1) $CH_3$ (Example 2) H (Examples 3 to 5)

EXAMPLE 1

A mixture of 1,1-bis(4-Dimethylamino)phenylethylene (Compound A) (0.5 g, 1.9 mmol), trimethyl orthobenzoate (0.18 g, 1 mmol) and a triarylsulphonium salt photoinitiator commercially available from Minnesota Mining and Manufacturing Company under the trade designation FX512 (0.5 g) was dissolved in methylethyl ketone (MEK) (30 ml). The mixture was then hand coated onto polyester and dried.

Two techniques were employed:

a) a sample was exposed to a 4 kW Parker Graphic UV light source for 100 seconds. There was an immediate formation of a near infrared absorbing dye in the exposed regions.

b) a sample was subjected to 10 seconds exposure with a handheld laboratory UV lamp followed by heating at 70° C. for 5 minutes. The latter process of thermal cure completes formation of a near infrared absorbing dye in the exposed regions.

EXAMPLE 2

A mixture of Compound A (0.5 g, 1.9 mmol), triethyl orthoacetate, (0.16 g, 1 mmol) and FX512 (0.5 g) was dissolved in MEK (30 ml). The mixture was handcoated onto polyester. Two exposure techniques were employed:

a) a sample was exposed to a Parker Graphics 4 kW UV light source for 100 seconds. Formation of a NIR absorbing dye was observed in the exposed region.

b) a sample was subjected to a 10 seconds exposure with a laboratory handheld UV light and then a thermal cure at 70° C. for 5 minutes resulting in formation of a near infrared absorbing dye in the exposed region.

EXAMPLE 3

A mixture of Compound A (0.25 g, 1 mmol) diphenyl iodonium hexafluorophosphate (0.22 g, 0.5 mmol) and triethyl orthoformate (0.08 g, 0.5 mmol) was dissolved in MEK (15 ml). The mixture was hand coated onto polyester and exposed using the handheld laboratory UV light for 15 seconds. The spectrum of the exposed coating had no absorption at 820 nm. The sample was then heated at 70° C. for 5 minutes and a near infrared absorbing dye was produced in the exposed region.

EXAMPLE 4

A mixture of Compound A (0.5 g, 1.9 mmol), Photoinitiator CG 24-61.

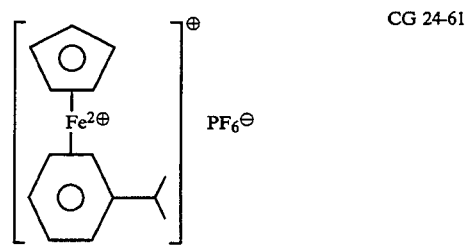

commercially available from Ciba Geigy, (0.35 g) and triethyorthoformate (0.15 g, 1 mmol) was dissolved together in ethanol (30 ml) and hand coated onto polyester. The sample was exposed for 500 seconds to the 4 kW Parker Graphic UV lamp to give a coating which absorbed near infrared light.

4 micron line resolution could be achieved by exposing a sample through an Ugra Plate Control Wedge.

EXAMPLE 5

| | |
|---|---|
| Compound A | 0.173 g |
| triethylorthoformate | 0.052 g |
| FX-512 | 0.173 g |
| polyurethane resin (MHFU-II disclosed in U.S. Pat. No. 4,837,082) | 0.350 g |
| RJ100 (a styryl/2-propen-1-ol copolymer commercially available | 0.116 g |

| | |
|---|---|
| from Monsanto) | |
| DESMODUR L75 (an aromatic isocyanate commercially available from Farbenfabriken Bayer AG) | 0.284 g |
| cyclohexanone | 100 ml | was spin coated onto two 8.75 cm (3.5 inch) magnetic diskettes at speeds of 1000 rpm and 500 rpm. The coated discs were each exposed to UV radiation through a suitable mask and heat treated at 95° C. for 5 minutes to produce NIR dye in the exposed regions. The sample was then washed in aqueous acetic acid (10% solution), followed by water, to remove any unreacted photoinitiator.

A TECHWAY 8.75 cm (3.5 inches) external drive modified to provide an oscilloscope trigger signal was used to determine storage capacity.

The disc coated at 1000 rpm could be formatted to 100% capacity (720 kbytes) and completed $22 \times 10^3$ repeat read cycles without failure. The disc coated at 500 rpm could be formatted to >95% capacity and completed $>34 \times 10^3$ repeat read cycles without failure.

I claim:

1. A photosensitive element for the production of near infrared absorbing images having a photosensitive medium comprising a trialkyl orthoester, a photochemical source of a strong acid and a compound of the formula (I):

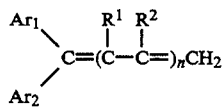

wherein:
   n is 0 or 1,
   $R^1$ and $R^2$ are independently members selected from the group consisting of hydrogen and alkyl groups of up to 5 carbon atoms and
   $Ar_1$ and $Ar_2$ are independently members selected from the group consisting of aryl groups bearing an electron-donating substituent in the 4-position.

2. A photosensitive element according to claim 1 wherein $R^1$ and $R^2$ are hydrogen.

3. A photosensitive element according to claim 1 wherein n is 0.

4. A photosensitive element according to claim 1 wherein at least one of $Ar_1$ and $Ar_2$ has the formula:

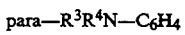

wherein:
   $R^3$ and $R^4$ are independently members selected from the group consisting of alkyl groups of up to 5 carbon atoms, aryl groups or $R^3$ and $R^4$ together complete a 5, 6 or 7 membered ring, or $R^3$ and $R^4$ together complete a julolidine ring system.

5. A photosensitive element according to claim 1 wherein said compound of formula (I) is 1,1,-bis(4-dimethylamino)phenylethylene.

6. A photosensitive element according to claim 1 wherein the trialkyl orthoester has the formula:

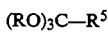

wherein:
   each R is independently a member selected from the group consisting of lower alkyl groups of up to 5 carbon atoms, and
   $R^5$ is a member selected from the group consisting of hydrogen, lower alkyl group of up to 5 carbon atoms and an aryl group.

7. A photosensitive element according to claim 6 wherein said trialkyl orthester is a member selected from the group consisting of triethyl orthoformate, triethyl orthoacetate and trimethyl orthobenzoate.

8. A photosensitive element according to claim 1 wherein said photochemical source of a strong acid is an onium salt having an anion.

9. A photosensitive element according to claim 8 wherein the anion is a member selected from the group consisting of $PF_6$, $AsF_6$, $SbF_6$, $BF_4$, $ClO_4$, $CF_3SO_3$.

10. A photosensitive element according to claim 8 wherein the photochemical source of a strong acid is a member selected from the group consisting of diaryliodonium and triarylsulphonium salts.

11. A photosensitive element according to claim 1 wherein the orthoester and photochemical source of a strong acid are each present in amounts of from 50 to 60 mol % of the compound of formula (I).

12. A photosensitive element according to claim 1 wherein the photosensitive medium comprises two or more contiguous layers.

13. A photosensitive element according to claim 1 wherein the photosensitive medium additionally comprises a binder.

14. A photosensitive element according to claim 1 wherein the photosensitive medium is present on a magnetic disc.

15. A method of generating an image comprising a near infrared absorbing dye which comprises providing a photosensitive element having a photosensitive medium comprising a trialkyl orthoester, a photochemical source of a strong acid and a compound of the formula (I),

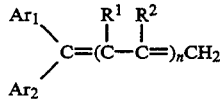

wherein:
   n is 0 or 1,
   $R^1$ and $R^2$ are independently members selected from the group consisting of hydrogen and alkyl groups of up to 5 carbon atoms and
   $Ar_1$ and $Ar_2$ are independently members selected from the group consisting of aryl groups bearing an electron-donating substituent in the 4-position and imagewise exposing the photosensitive element to actinic radiation and optionally heating the exposed element.

* * * * *